United States Patent [19]

Tottrup et al.

[11] Patent Number: 4,631,182

[45] Date of Patent: Dec. 23, 1986

[54] PROCESS FOR PREPARATION OF A REDUCING GAS

[75] Inventors: Peter B. Tottrup, Allerød; Jens R. Rostrup-Nielsen, Virum, both of Denmark

[73] Assignee: Haldor Topsoe A/S, Denmark

[21] Appl. No.: 696,291

[22] Filed: Jan. 29, 1985

[30] Foreign Application Priority Data

Feb. 1, 1984 [DK] Denmark ............... 446/84

[51] Int. Cl.$^4$ .......................................... C10B 3/26
[52] U.S. Cl. ............................. 423/652; 252/373; 423/415 A; 423/648 R
[58] Field of Search ............... 423/652, 415 A, 648 R; 252/373

[56] References Cited

U.S. PATENT DOCUMENTS

| | | | |
|---|---|---|---|
| 2,198,553 | 4/1940 | Roberts, Jr. .............. | 423/652 |
| 3,019,100 | 1/1962 | Robson ..................... | 423/652 |
| 3,748,120 | 7/1973 | Beggs et al. .............. | 252/373 |
| 3,828,474 | 8/1974 | Quarlulli .................. | 252/373 |
| 3,912,502 | 10/1975 | Miyashita et al. ......... | 252/373 |
| 4,071,330 | 1/1978 | Sederquist ................ | 423/652 |
| 4,234,451 | 11/1980 | Jockel et al. ............. | 252/373 |
| 4,473,543 | 9/1984 | Setzer et al. ............. | 423/652 |

FOREIGN PATENT DOCUMENTS

| | | |
|---|---|---|
| 1058758 | 2/1967 | United Kingdom . |
| 1182829 | 3/1970 | United Kingdom . |
| 1397315 | 6/1975 | United Kingdom . |
| 2015027 | 9/1979 | United Kingdom . |
| 5427213 | 3/1977 | U.S.S.R. .............. 423/652 |

*Primary Examiner*—Curtis R. Davis
*Attorney, Agent, or Firm*—Lawrence Rosen

[57] ABSTRACT

The invention relates to a process for the preparation of a reducing gas having a high reduction potential by catalytic conversion in two steps of a sulphur-free gas mixture of hydrocarbons having a high content of hydrocarbons with two or more carbon atoms. In the first step an inlet stream of at least a part of the gas mixture together with added steam is passed through an adiabatic reactor containing a steam reforming catalyst at an inlet temperature of 440°–510° C. and an outlet temperature of 400°–500° C. and at a pressure of 1–30 kg/cm$^2$g the amount of steam added being calculated for obtaining in the inlet stream an H/C ratio of at least 4.8 and an O/C ratio of between 0.5 and 1. The outlet stream from the first step is combined with the top-gas from a reduction furnace, and the combined stream is then further converted in the second step by steam reforming into a reducing gas.

10 Claims, 2 Drawing Figures

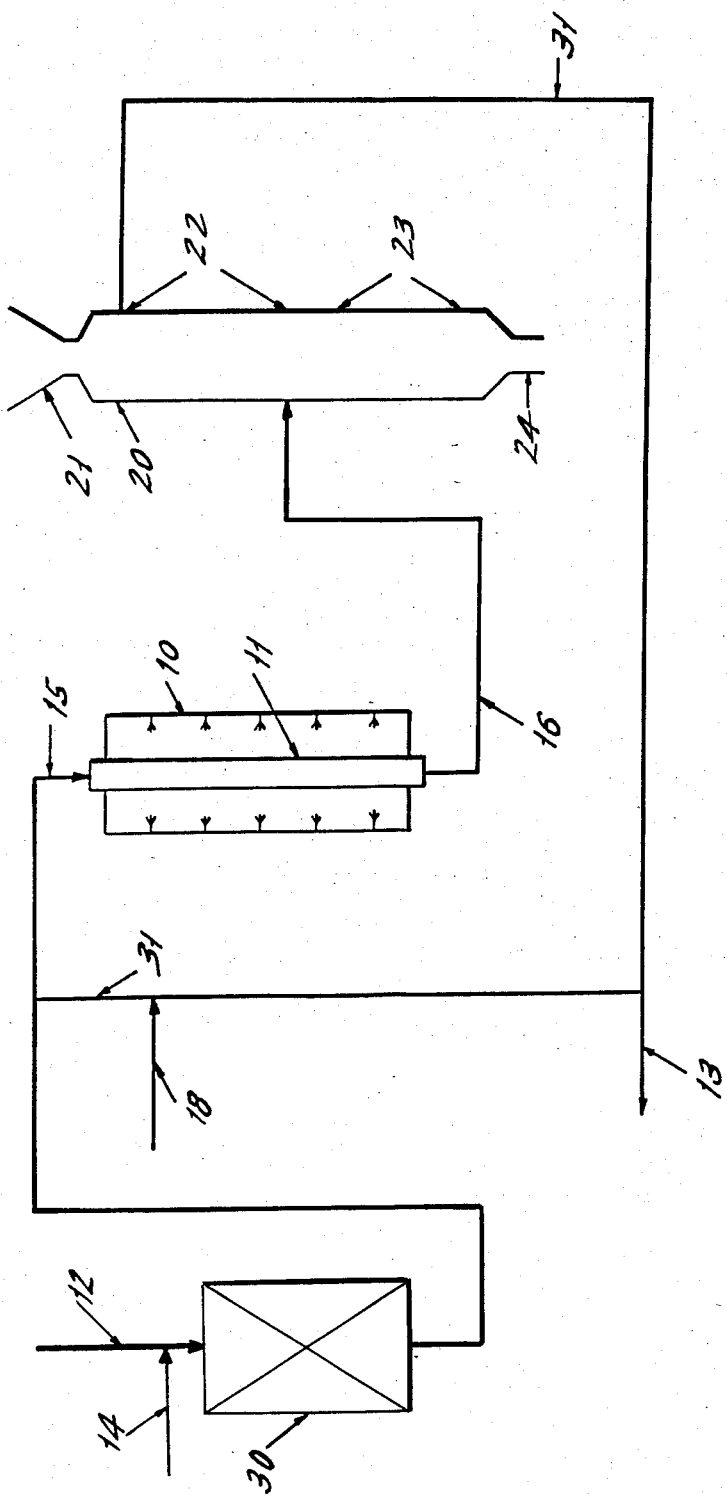

PROCESS FOR PREPARATION OF A REDUCING GAS

FIELD OF THE INVENTION

The present invention relates to an improved process for preparing reducing gases, especially gases suitable for use in the gaseous direct reduction of iron oxides and similar reduction processes but also for other purposes such as oxo syntheses.

BACKGROUND OF THE INVENTION

Processes are known for the gaseous direct reduction of iron oxides to produce metallic iron in a solid state, as opposed to the reduction of iron ores in blast furnaces to produce molten iron.

Manufacture of iron traditionally takes place in blast furnaces where the overall reaction is that solid coke at elevated temperature reacts with iron oxides to form free molten metal and carbon oxides. An alternative to this is the process of solid or gaseous direct reduction. In the former, carbon is used for the reduction and in the latter, an iron oxide, often in the form of pellets, is reduced by hydrogen and/or carbon monoxide thereby forming so-called sponge iron. Conventional steel making is well suited for large scale production resulting in relative low product price. Direct reduction is suitable for small scale production. This may be an advantage in itself and moreover makes the necessary capital investment relatively low. Direct reduction may therefore be of particular interest in countries with a comparatively low degree of industrialization or with a highly decentralized steel industry. On the other hand, production costs in direct reduction plants are usually slightly above the costs involved when using conventional methods. Improvements in the gaseous direct reduction processes are therefore desirable.

In installations for the gaseous direct reduction of iron oxides, it is necessary to combine the plant for the reduction proper with a plant for producing the gases—hydrogen and/or carbon monoxide—with which to carry out the reduction.

The two plants are of course interconnected and outlet gases from the former or fractions or parts thereof are often recycled to the latter. The two plants and the processes are naturally adjusted to one another but fundamentally, the reduction process is a reduction process comparable with other reduction processes; and the process for preparing the reducing gases a process comparable to other processes for preparing reducing gases.

In principle, the production of reducing gases for the process in question may take place by a reforming process. In order to illustrate the principles and problems involved in such known processes, especially when used in connection with a process for the gaseous direct reduction of iron oxides, reference is first made to FIG. 1 on the drawing, which shows a flow diagram for a plant for carrying out such processes.

The drawing is very much simplified, omitting a number of details such as gas blowers, compressors, coolers, heat exchangers, and heaters, means for sulphur absorption, auxiliaries for controlling temperature, pressure, flows, etc.

A reformer furnace 10 is a conventional tubular reformer with reactor tubes 11 containing a catalyst. A hydrocarbon feed stream 12 and a gas stream 31 containing oxidizing constituents are combined and introduced, via line 15, into the reformer tubes. The product gas from the reformer furnace (i.e. the reducing gas) is via line 16 introduced into a reduction furnace 20. The flow through the reformer is usually downflow in conventional reformers and as shown on the drawing. However, upflow is often employed in reformers combined with plants for reducing metal oxides.

The raw oxidic ore material is introduced into the reduction furnace 20 through an inlet 21 at the top of the furnace and moves continuously or intermittently downwards through a reduction zone, 22. From the reduction zone the reduced material is passed through a cooling zone 23. The cooling may be achieved by a counter current stream of cooling gas for instance a partial stream of the top gas. The reduced ore material leaves the furnace through an outlet system 24.

After reduction of the ore materials, the reducing gas, itself being partly oxidized to a so-called top-gas, leaves the furnace through line 31 and finally joins the hydrocarbon feed 12. Line 13 is a necessary purge serving to avoid accumulation of a number of components either supplied through line 12 or formed in the furnace during reduction of ore materials. The contents of combustible gases in line 31 usually are as high as 70% (v/v), which means that it is still useful as feedstock for the reforming though its reduction potential (to be explained later) is too low. To improve the economy of the overall process, the purge gas is usually fired into the reformer furnace. If the contents of oxidizing constituents in line 31 for some reason is not as high as desired, for instance during start up, oxidizing constituents may be supplied through line 18.

Hydrocarbon feedstocks suitable for steam reforming are for instance natural gas, refinery off-gases, liquified petroleum gases (LPG), and naphtha.

Taking methane (the predominant constituent of natural gas) as an example, the reforming reactions with steam and carbon dioxide are as follows:

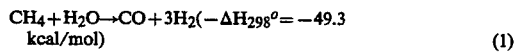

$$CH_4 + H_2O \rightarrow CO + 3H_2 (-\Delta H_{298}^\circ = -49.3 \text{ kcal/mol}) \quad (1)$$

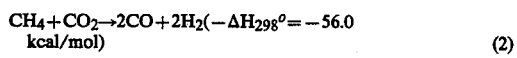

$$CH_4 + CO_2 \rightarrow 2CO + 2H_2 (-\Delta H_{298}^\circ = -56.0 \text{ kcal/mol}) \quad (2)$$

Both reactions (1) and (2) are highly endothermic, i.e. proceeding of the reactions from left to right is connected with heat consumption. This fact combined with the principle of Le Chatelier makes it evident that formation of CO and $H_2$ is facilitated by high temperature and/or low pressure. The production of gases rich in $H_2$ and CO in industrial plants therefore takes place at temperatures in the range of 400° C. to 1,000° C. and pressures from 1 atm to 75 atm, preferably 1–10 atm.

However, in addition to the reforming reactions (1) and (2), certain carbon forming reactions may occur as follows:

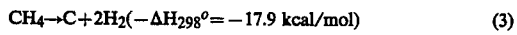

$$CH_4 \rightarrow C + 2H_2 (-\Delta H_{298}^\circ = -17.9 \text{ kcal/mol}) \quad (3)$$

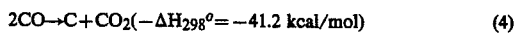

$$2CO \rightarrow C + CO_2 (-\Delta H_{298}^\circ = -41.2 \text{ kcal/mol}) \quad (4)$$

$$C_nH_m \rightarrow nC + m/2 H_2 \quad (5)$$

The carbon hereby formed is detrimental in several ways. It decreases the activity of the catalyst by blocking its active sites. Carbon formation may also cause spalling and thereby destruction of the valuable catalyst resulting in increased pressure drop over the catalyst bed. It will often be necessary to close the entire plant down in order to replace the catalyst.

The tendency to carbon formation according to the reaction schemes (3), (4), and (5) can be avoided or minimized by selecting proper reaction conditions. The most important parameters to be taken into account are pressure, temperature, reformer feed gas composition, and catalyst.

It is also known that the tendency to carbon formation may be reduced by carrying out the reforming process in the presence of a sulphur compound. According to British patent specification No. 2,015,027, this is achieved by having a sulphur content in the feed gas introduced into the reactor of 2-10 ppm by vol., calculated as $H_2S$. This method of controlled sulphur passivation is practicable because the feed stream contains sulphur.

The reducing gas from the reformer (line 16 on the drawing) consisting of hydrocarbons, steam, carbon monoxide, carbon dioxide, hydrogen, inerts (primarily $N_2$) and traces of hydrogen sulphide can be characterized in several ways.

The reduction potential is calculated as the ratio (constituents given in mole %):

$$R = (H_2 + CO)/(CO_2 + H_2O)$$

Other figures useful for describing the feed gas for the reformer are the atomic ratios O/C, H/C, $H_2O/C$, and $H_2O/C_nH_m$. These ratios are defined as follows:

$$O/C = (H_2O + CO + 2CO_2)/(CO + CO_2 + CH_4 + (nC_nH_m))$$

$$H/C = (2H_2O + 2H_2 + 4CH_4 + (mC_nH_m))/(CO + CO_2 + CH_4 + (nC_nH_m))$$

$$H_2O/C = H_2O/(CH_4 + (nC_nH_m))$$

$$H_2O/C_nH_m = H_2O/(nC_nH_m)$$

everything expressed in mole % and n being a whole number larger than 1.

Generally speaking, it is desirable to obtain for a direct reduction plant a reducing gas with a high reduction potential. In commercial gaseous direct reduction plants, the reduction potential of the reducing gas prior to entering the reduction furnace (through line 16 of the drawing) should be in the range of 10-25. The spent reducing gas leaving the reduction furnace (through line 31) may have a reduction potential of around 2 in commercial plants.

It is well known that carbon formation may be prevented by applying the steam in amounts well in excess of the stoichiometric amount according to reaction scheme (1). However, thereby the reduction potential becomes too low unless steam and/or carbon dioxide are removed before the reducing gas is passed into the reduction furnace. The removal of oxidizing constituents is expensive and tends to adversely influence the economy of a direct reduction plant.

As mentioned, natural gas is a suitable feedstock for manufacturing reducing gases. Natural gas consists of methane, inerts (primarily $N_2$) and traces of sulphur compounds and in addition, $CO_2$ and other components may be present. The actual composition depends on the origin of the natural gas. Some natural gases contain hydrocarbons higher than methane, usually ethane, propane, butane, and traces of pentane and hexane. The contents of higher hydrocarbons in such natural gases may be above 0.5%, usually of the order of 0.5-10% (v/v) of the total amount of hydrocarbons present. Natural gas from the North Sea is an example of a natural gas containing comparatively large amounts of higher hydrocarbons. However, higher hydrocarbons are much more apt to give carbon formation in the reforming process (reaction (5)) than is methane and actually, serious problems with carbon formation have been encountered when a feedstock is changed from ordinary natural gas to a natural gas containing higher hydrocarbons. In such cases, one normally needs to increase the amount of steam added. Therefore, a complication is that it is more difficult to obtain a reformed gas having a high reduction potential from a natural gas containing higher hydrocarbons than from one wherein the only hydrocarbon is methane.

As described above, it may be advantageous to carry out the reforming process in presence of sulphur, which may passivate the catalyst for carbon formation from methane (reaction (3)) and carbon monoxide (reaction (4)). However, when higher hydrocarbons are present in the feedstock, these may crack thermally over the sulphur passivated catalyst. The thermal cracking results in olefins which may easily react further into carbon.

One solution to the problem is described in the above cited British patent specification No. 2,015,027, which relates to a reforming process carried out in the presence of sulphur compounds aiming at production of a reducing gas having a high reduction potential from a feedstock rich in methane and generally containing 0.5-10% v/v of higher hydrocarbons, yet avoiding carbon formation. This is achieved by using in the colder parts of the reactor a catalyst containing 2-20% w/w of nickel and molybdenum, calculated as oxides, the atomic ratio Mo:Ni being 1:1-4:1, supported on a carrier consisting of 70-80% w/w of alumina and 30-20% w/w of zirconia; and by having an O/C ratio of 0.8-1.2 and an $H_2O/C$ ratio of below 0.4 in the feed gas mixture fed into the reactor.

In principle, it is possible to avoid carbon formation by carrying out the reforming reaction as described above. However, some problems still remain unsolved. One of these problems relates to the catalyst activity which in practice, due to sulphur poisoning, will be reduced to a level not acceptable in an industrial plant. Another problem is that in practice it has not always been possible to achieve carbon free operation. Thus, carbon formation still takes place, although to a smaller extent. The carbon formation is believed to be caused by thermal cracking of the higher hydrocarbons at the hot tube wall leading to olefins which are carbon precursors.

Another known principle to avoid carbon formation from the higher hydrocarbons is to use an alkali or alkaline earth metal containing material (catalyst or inert carrier) in the vertical part of the tube as described in British patent specification No. 1,058,758. This process has the drawback that a continuous loss of the alkali or alkaline earth metal will take place necessitating a frequent replacement, e.g. by adding alkali or alkaline earth metal to the inlet stream of the reformer furnace, e.g. in a similar manner as described for a cracking process in British Patent Specification No. 1,397,315.

A third known method of solving the problem of carbon formation from higher hydrocarbons is to carry out a preconversion of the feedstock without the presence of sulphur and at low temperatures (<500° C.), where thermal cracking can be neglected. This method has been described for processes operating at H₂O/C close to 1 mole/C-atom, i.e. O/C≦1 and H/C≦6 (Scan. J. Metallurgy 8, 168 (1979), and Proc. Symp. "Natural Gas as Raw Material for the Chemical Industry and for manufacture of Reducing Gases in Ore Treatment" Karlsruhe 1972, Paper 17). This process shows no problems of carbon formation from methane (reaction (3)) or carbon monoxide (reaction (4)). The carbon formation from higher hydrocarbons (reaction (5)) on the catalyst can be eliminated by using a special catalyst of the type used for steam reforming of naphtha. For given process conditions ($H_2O/C_nH_m$, n>1) and catalyst, there is a temperature above which carbon will be formed (reaction (5)) ("Catalytic Steam Reforming", Catalysis, Science and Technology, Vol. 5, Chapter 1, 1983, Springer Verlag). With H₂O/C close to 1 mole/atom, the normal content of higher hydrocarbons in natural gas represents no problem.

In process schemes where the top-gas from the reduction furnace is recycled to the reformer, it is not possible to carry out the above preconversion of the feed gas. The major part of oxidant is carbon dioxide (according to reaction (2)) from the top gas, and hence the process operates at H₂O/C less than 1 mole/C-atom although the overall O/C is close to 1. The presence of carbon dioxide and carbon monoxide results in a low H/C of approximately 3. With O/C=1 and an H/C of approximately 3, it is not possible to avoid carbon on nickel catalysts from methane (reaction (3)), carbon monoxide (reaction (4)), or higher hydrocarbons (reaction (5)) without the presence of sulphur. Thermodynamic calculations show potential for carbon formation up to approximately 750°-900° C. Hence, it will not be possible to carry out a preconversion of the feed gas at low temperature on a sulphur-free catalyst.

BRIEF DESCRIPTION OF THE INVENTION

According to the present invention, the problem can be solved by passing only the steam and the feedstock, e.g. a natural gas stream (or part of it) through the preconverter. This will give an O/C ratio of between 0.5 and 1, typically 0.7-0.8, and an H/C ratio of approximately 5. In this way, it is possible to operate without carbon formation up to temperatures of approximately 520°-550° C. Hence, it is possible to carry out an adiabatic conversion of the natural gas (with higher hydrocarbons) at an inlet temperature close to 500° C., preferably 440°-510° C., and an exit temperature above 400° C., preferably 400°-500° C., depending on the composition of the natural gas. The low exit temperature is a result of the endothermic reactions (1) and (2) and similar reactions for higher hydrocarbons. In order to maintain sufficient catalyst activity, it is preferable to operate at temperatures above 400° C. This requires a higher inlet temperature close to 500° C.

By using a conventional magnesia-based nickel catalyst designed for steam reforming of higher hydrocarbons (incl. naphtha) and described in British patent specification No. 1,182,829, it was surprisingly found that it is possible at the low ratio H₂O/C=0.7 mole/C-atom to convert natural gas with substantial amounts of higher hydrocarbons without carbon formation (see Examples).

BRIEF DESCRIPTION OF THE DRAWING

In order to further illustrate the process of the invention reference is made to FIG. 2 of the drawings showing a preferred embodiment of the invention. As it will appear most of the elements of FIG. 2 are identical with those of FIG. 1 the difference being the inclusion of a reactor 30 for catalytic preconversion of the hydrocarbon feed stream 12.

An inlet stream for the reactor 30 is made by combining the hydrocarbon feed stream 12 and a steam stream 14. The steam may for instance be produced by waste heat from the reformer furnace 10. The inlet stream is preheated to a temperature of 440°-510° C. and is then passed through the reactor 30 containing a steam reforming catalyst. During the passage of the catalyst the hydrocarbons of the inlet stream are partially converted according to the reactions (1) and (2) or similar reactions for the higher hydrocarbons.

Figure 1:
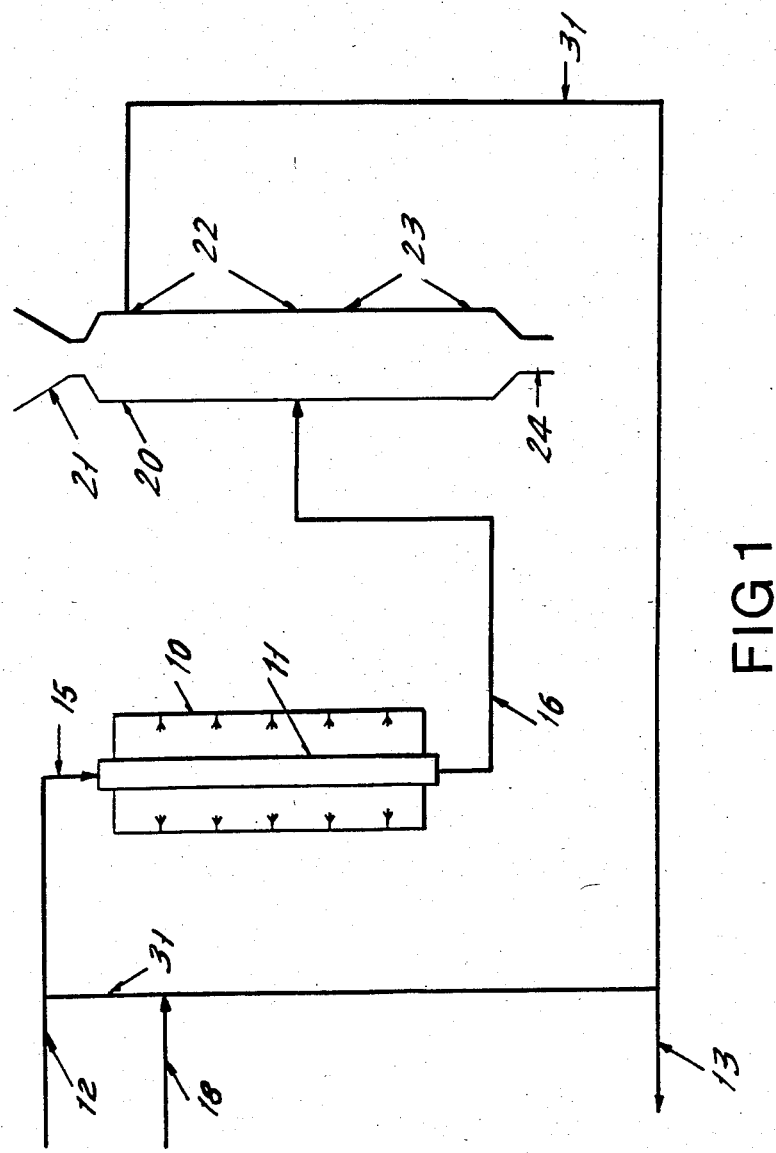

The outlet stream from the reactor 30 is then combined with the gas stream recycled from the reduction furnace 20. Steam reforming of the combined stream is then carried out in the reformer furnace 10. The product gas from the reformer furnace 10 is via line 16 introduced into the reduction furnace 20 for reduction of an ore material as described above. The outlet gas stream from the reduction furnace is led via the line 31 and is combined with the outlet stream from the reactor 30.

DETAILED DESCRIPTION OF THE INVENTION

The composition of the raw material to be converted by the process of the invention can vary within rather wide limits. Thus is will be possible to convert natural gases with a content of ethane and higher hydrocarbons of up to 70%, the content of propane and higher hydrocarbons being at the same time maximum 40% (the percentages in both cases being calculated on basis of the number of carbon atoms). In cases where the natural gas has a high content of higher hydrocarbons it will usually be preferred to carry out a preconversion of the total volume of the gas. However, in specific cases it might be preferred to carry out a preconversion of only a part of the natural gas letting the remaining part of the gas by-pass the preconversion reactor.

The process of the invention may be carried out at pressures between 1 and 30 kg/cm² g, typically at 1-10 kg/cm² g and preferably at 1-5 kg/cm² g. In cases where the raw material contains sulphur, removal of sulphur must be carried out to avoid poisoning of the preconversion catalyst. A number of methods for sulphur removal are known. A frequently used method consists in contacting the gas mixture to be desulphurized with zinc oxide.

Several modifications of the described process scheme are possible without departing from the scope of the invention.

Especially in cases where the gas mixture has a high content of higher hydrocarbons it may be preferred to carry out the preconversion at an increased $H_2O/C_nH_m$ ratio of the inlet stream thereby reducing the risk of carbon formation.

According to another preferred embodiment of the invention, this can be done by recycling a part of the outlet stream from the preconversion reactor 30 back to the inlet of this reactor.

According to a further preferred embodiment of the invention, an increased $H_2O/C_nH_m$ ratio of the inlet stream can be obtained by splitting the gas mixture into two split streams. The entire amount of steam is then added to the first split stream forming a first inlet stream which is reacted in a first adiabatic reactor. The outlet stream from the first reactor is combined with the second split stream forming a second inlet stream, which is reacted in a second adiabatic reactor. In this embodiment of the invention, the process conditions will correspond to the conditions prevailing when using a single reactor without recycle for conversion of a gas mixture with a lower content of higher hydrocarbons.

In both of the latter embodiments, the net result is that it is possible to carry out a preconversion at a higher $H_2O/C_nH_m$ ratio of the inlet stream without increasing the amount of steam added for a given amount of gas mixture to be converted.

In the following, the process according to the invention will be further illustrated by way of Examples. The examples are based on experiments carried out in laboratory scale (Example 1) and in pilot scale (Example 2).

EXAMPLE 1

A naphtha reforming catalyst (Topsoe RKNR) was charged into a laboratory reactor with an inner diameter of 22.0 mm. The catalyst particles were cylindrical and had the dimensions 4.5×4.5 mm. The catalyst bed had a height of 280 mm and a volume of 106.4 ml. Adiabatic preconversion was carried out using an inlet stream of hydrocarbons and steam and using the process parameters as indicated below:

| | |
|---|---|
| Inlet temperature | 450° C. |
| Pressure | 2 kg/cm²g |
| O/C ratio | 0.7 |
| $H_2O$-flow | 140 Nl/h |
| C-flow | 200 Nl/h |

Two experiments were carried out as follows:

| Experiment | A | B |
|---|---|---|
| Duration, h | 96 | 24 |
| $CH_4$, Nl/h | 200 | 140 |
| $C_3H_8$, Nl/h | 0 | 20 |
| Distribution of C: | | |
| $CH_4\%$ | 100 | 70 |
| $C_3H_8\%$ | 0 | 30 |
| $H_2O/C_nH_m$ ratio | — | 2.3 |
| H/C ratio | 5.4 | 5.0 |
| Carbon formation | No | No |

In accordance with the process of this invention, experiment B was carried out on a gas having a considerable content of hydrocarbons having three or more carbon atoms per molecule, namely 30% calculated as hereinbefore explained.

EXAMPLE 2

A naphtha reforming catalyst (Topsoe RKNR) was charged into a pilot scale reactor with an inner diameter of 267 mm. The catalyst particles were cylindrical and had the dimensions 4.5×4.5 mm. The catalyst bed had a height of 1800 mm and a volume of 100 l. After an initial operation of 467 hours with lean natural gas (containing ethane and less than 0.1% by volume of hydrocarbons with more than two carbon atom) propane and hexane were added in increasing amounts during a period of 379 hours. Thereafter, adiabatic preconversion according to the process of this invention was carried out for a period of 312 hours using an inlet stream comprising a mixture of hydrocarbons and steam at the following conditions:

| | |
|---|---|
| Duration | 312 h |
| Inlet temperature | 478° C. |
| Outlet temperature | 438° C. |
| Pressure | 3.2 kg/cm²g |
| O/C ratio | 0.74 |
| $H_2O/C_nH_m$ ratio (n 2) | 2.6 |
| H/C ratio | 5.1 |
| $H_2O$-flow | 137 Nm³/h |
| C-flow | 185 Nm³/h |

The gas composition in % by volume were as indicated below:

| | Inlet gas | Outlet gas |
|---|---|---|
| $H_2$ | 1.70 | 11.40 |
| $H_2O$ | 46.59 | 32.12 |
| $N_2$ | 0.22 | 0.18 |
| CO | 0.03 | 0.25 |
| $CO_2$ | 0.30 | 4.70 |
| $CH_4$ | 45.34 | 51.35 |
| $C_2H_6$ | 1.55 | — |
| $C_3H_8$ | 3.50 | — |
| $C_4H_{10}$ | 0.07 | — |
| $C_6H_{14}$ | 0.68 | — |

The catalyst was inspected after 312 hours of operation at these conditions (i.e. a total operation of 1158 hours). The catalyst showed no signs of carbon formation.

What is claimed is:

1. A process for the preparation of a reducing gas containing hydrogen and/or carbon monoxide and having a high reduction potential by catalytic conversion in two steps of a sulphur-free hydrocarbon feedstock gas having a content of hydrocarbons having two or more carbon atoms of up to 70% and a content of hydrocarbons having three or more carbon atoms at the same time of up to 40%, the percentages being calculated on basis of the number of carbon atoms, wherein, in the first step at least a part of the gas together with added steam is passed as an inlet stream through an adiabatic reactor containing a steam reforming catalyst at an inlet temperature of 440°-510° C. and an outlet temperature of 400°-500° C. and at a pressure of 1-30 kg/cm² g, the amount of added steam being calculated for obtaining in the inlet stream an H/C ratio of at least 4.8 and an O/C ratio of between 0.5 and 1, the outlet gas stream from the adiabatic reactor being combined with the outlet gas stream from a reduction furnace, and in the second step the combined stream is further converted by steam reforming into a reducing gas.

2. The process claimed in claim 1, wherein the first step of the catalytic conversion is conducted at a pressure of 1-10 kg/cm² g.

3. The process claimed in claim 1, wherein the first step of the catalytic conversion is conducted at a pressure of 1-5 kg/cm² g.

4. The process claimed in claims 1, 2 or 3, wherein the catalyst is a reforming catalyst suited for steam reforming of higher hydrocarbons comprising at least 35% by weight magnesia the remaining constituents being nickel, alumina, and magnesium aluminium spinel.

5. The process claimed in claims 4, wherein the entire gas mixture is passed through the first step of the conversion.

6. The process claimed in claims 4, wherein the O/C ratio of the inlet stream is 0.7–0.8.

7. The process claimed in claim 4, wherein the feedstock gas is natural gas.

8. The process claimed in claim 4, wherein the feedstock gas comprises hydrocarbons and hydrogen.

9. The process claimed in claim 1, wherein a portion of the outlet gas stream from the adiabatic reactor is recirculated to the inlet stream to the adiabatic reactor.

10. The process as claimed in claim 1, wherein said first step is effected in two phases; the first phase comprising dividing the feedstock gas into first and second streams, passing the first stream with added steam as an inlet stream through the adiabatic reactor, the amount of added steam being calculated for obtaining in the inlet stream an H/C ratio of at leas 4.8 and an O/C ratio of between 0.5 and 1 based on the combined first and second inlet streams; and the second phase comprising combining the outlet stream from the adiabatic reactor with the second feedstock stream to form a second inlet stream which is passed through a second adiabatic reactor containing a steam reforming catalyst at an inlet temperature of 440°–510° C. and an outlet temperature of 400°–500° C. and at a pressure of 1–30 kg/cm² g, the outlet gas stream from the second adiabatic reactor being combined with said outlet gas stream from a reduction furnace.

* * * * *